United States Patent [19]
Kauffman John H.

[11] 3,821,978
[45] July 2, 1974

[54] AUTOMATIC FOUNDRY SYSTEM

[75] Inventor: Kauffman John H., Richland Center, Wis.

[73] Assignee: National Engineering Company, Chicago, Ill.

[22] Filed: Dec. 21, 1972

[21] Appl. No.: 317,428

[52] U.S. Cl............ 164/154, 164/269, 164/323, 164/404
[51] Int. Cl............. B22d 17/32, B22d 47/00
[58] Field of Search....... 164/4, 130, 131, 154, 269, 164/323, 324, 329, 404, 412

[56] References Cited
UNITED STATES PATENTS

| | | | |
|---|---|---|---|
| 2,466,650 | 4/1949 | Walker et al. | 164/404 X |
| 2,681,738 | 6/1954 | Granath | 214/46.22 |
| 3,254,376 | 6/1966 | Burnett | 164/323 |
| 3,627,028 | 12/1971 | Carignan | 164/130 X |

Primary Examiner—J. Spencer Overholser
Assistant Examiner—John E. Roethel

[57] ABSTRACT

An automatic foundry system comprises a plurality of mold pallet lines directed to discharge onto a common shakeout conveyor for carrying castings to a shakeout unit for separating the castings and molding sand. Each mold pallet line comprises a track, a plurality of pallet carts movable between a molding station at one end of the track mold and a dumping station at the other end adjacent the shakeout conveyor. The mold dumping stations include a gate mechanism, a mold dumping device for dumping the molds from the pallet carts onto the shakeout conveyor and initiating the return of the carts to the molding station. Control means is provided for initiating a sequential dumping of a selected number of carts from one or more selected pallet lines before carts from separate or different pallet lines may be dumped. Accordingly, different castings from different lines are not generally intermixed and the requirement of additional sorting operations after shakeout is completed is reduced.

18 Claims, 9 Drawing Figures

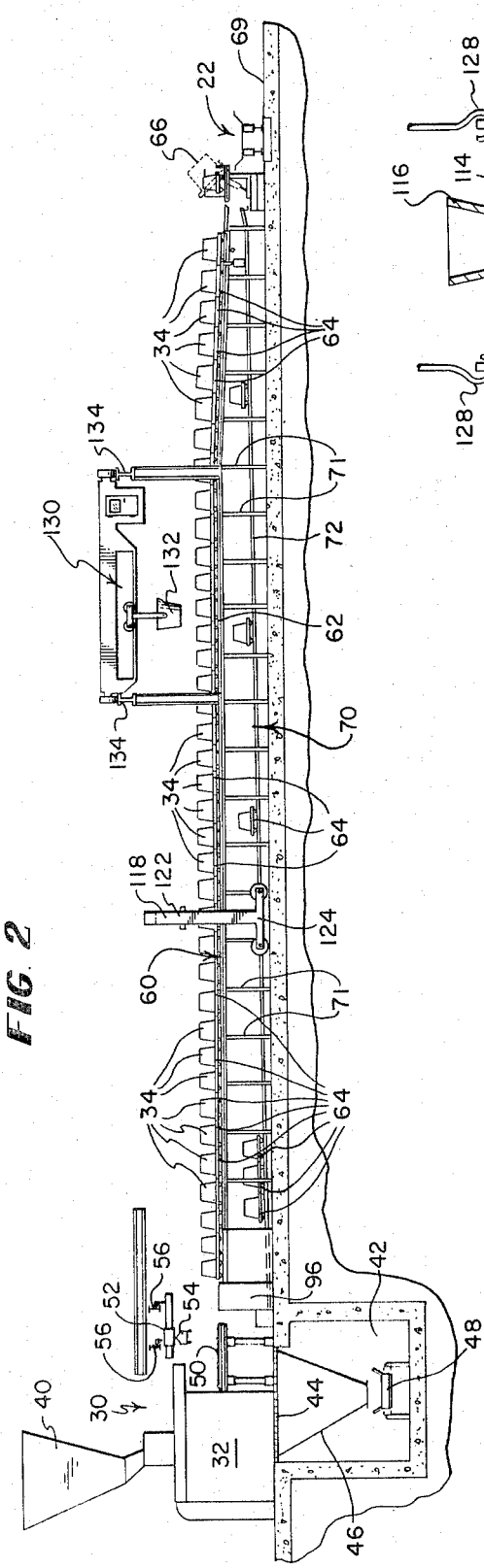
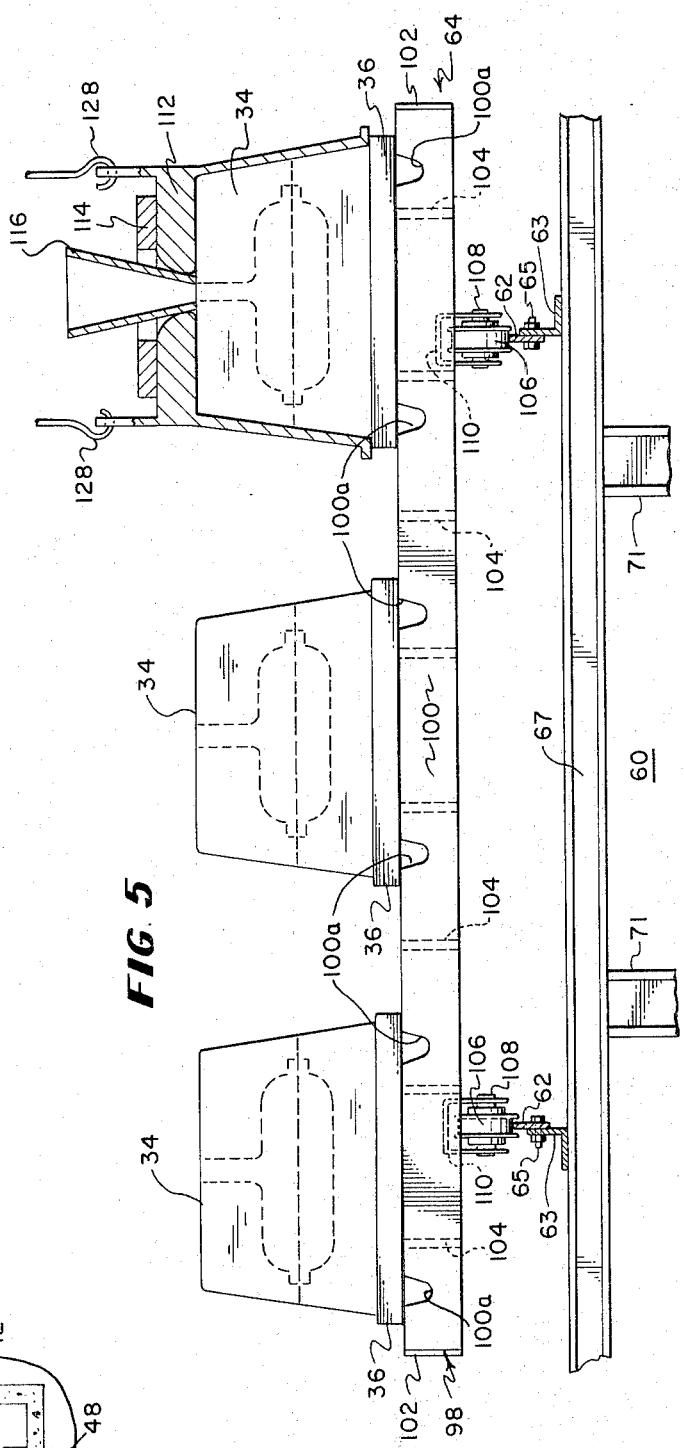

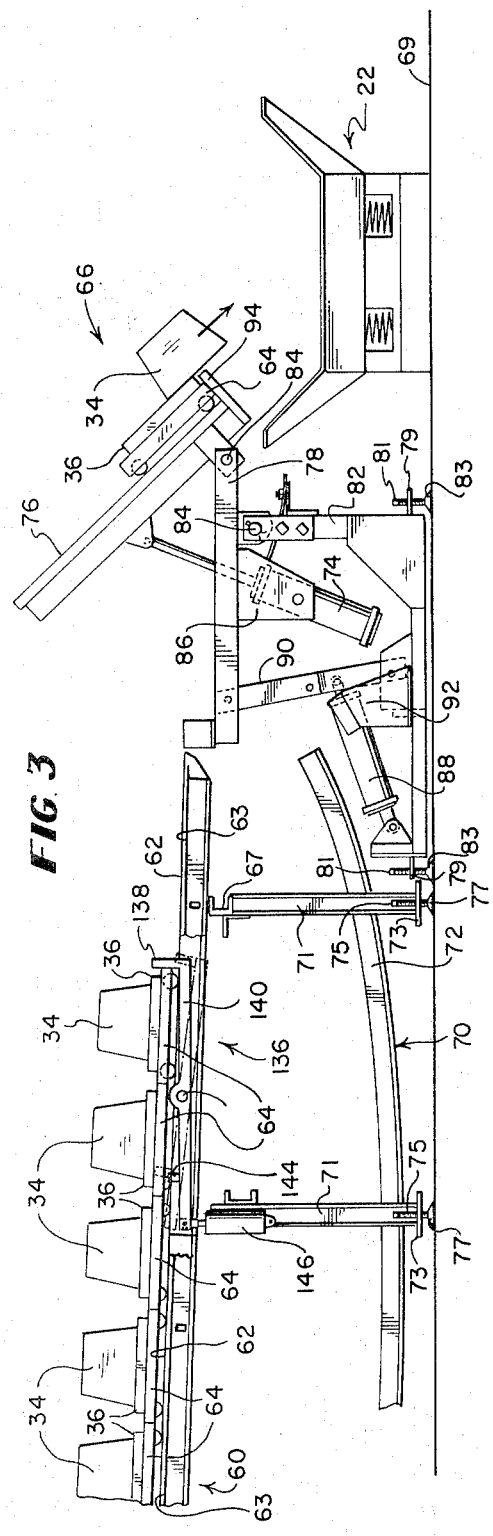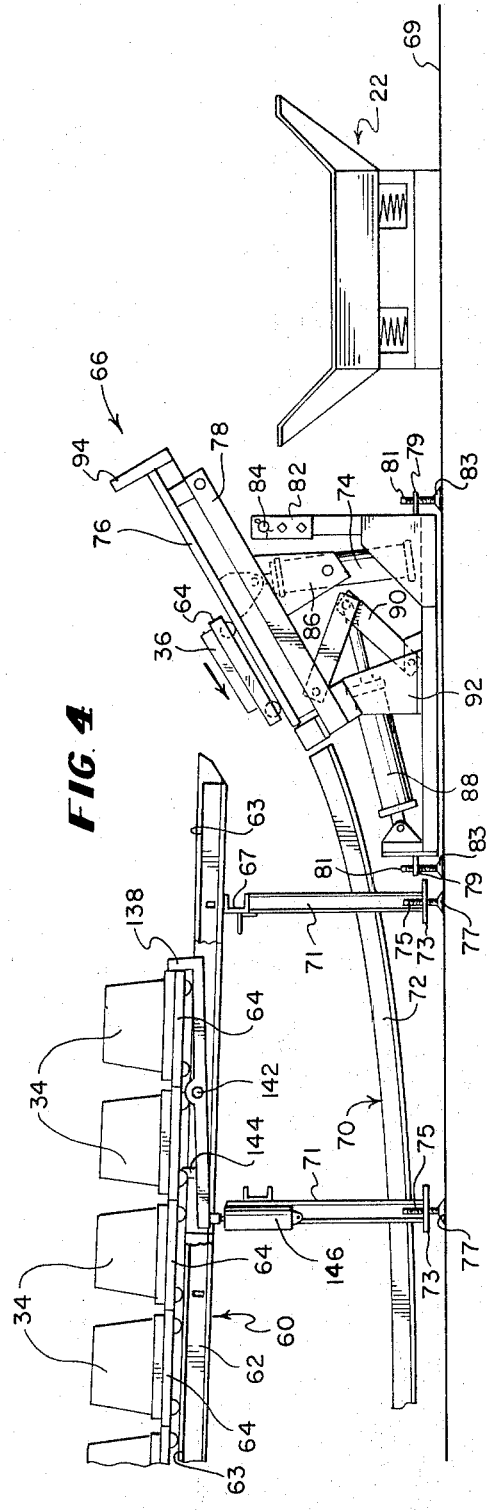

AUTOMATIC FOUNDRY SYSTEM

The present invention relates to an automatic foundry system comprising a moving pallet floor system having a plurality of mold pallet lines feeding into a common shakeout conveyor which carries the castings and sand to a shakeout device wherein the castings and molding sand are separated from one another. The system includes a programmable control means for initiating the sequential dumping of a selected number of molds from one or more selected pallet lines before the molds from other pallet lines usually having different castings are introduced into the shakeout system. This arrangement provides for little if any, intermixing of different types of castings so that subsequent sorting operations are minimized. The novel mold pallet lines also greatly reduce the requirement for man power on the molding floor and an automatic system is provided to handle the operations as molding floors are generally hazardous and unpleasant places for workers in most foundries because of heat and smoke.

It is an object of the present invention to provide a new and improved automatic foundry system. More specifically it is an object of the present invention to provide a new and improved automatic foundry system of the character described having programmed control means for initiating sequential dumping of molds from a selected pallet line before the molds from a different pallet line are dumped onto a shakeout conveyor.

More particularly it is an object of the invention to provide a new and improved automatic foundry system wherein automatic means are provided for dumping of molds from a particular pallet line before molds from a different line are dumped into the shakeout system.

Another object of the invention is to provide an automatic foundry system wherein the man power required on the pallet floor is reduced to a minimum and wherein the foundry operation is almost completely automatic from the time of initially forming the molds to the time when the finished castings are separated from the molding sand.

Another object of the invention is to provide an automatic foundry system having a novel pallet floor comprising a plurality of pallet carts movable along separate tracks and feeding a common shakeout conveyor.

Another object of the invention is to provide a new and improved automatic foundry system of the character described in the preceding paragraph including means for controlling the dumping of pallet carts into the common shakeout conveyor in a manner wherein a group of one type of castings are deposited onto the shakeout conveyor before groups of different types of castings are processed, thus reducing the requirement for subsequent sorting of castings at the end of the process.

Another object of the present invention is to provide an automatic foundry system of the character described including programmable control means for initiating the sequential dumping of selected number of pallet carts from a selected pallet line before dumping of molds from another wherein the amount and sequence of the dumping may be selected and adjusted as required.

Briefly, the foregoing and other objects and advantages of the present invention are accomplished in a new and improved automatic foundry system which comprises a plurality of mold pallet lines arranged to discharge onto a common shakeout conveyor for carrying the molds and castings to a shakeout device for separation. Each of the pallet lines comprises a track, a plurality of mold pallet carts movable on the tracks between a molding station at one end and a dumping station at the other end adjacent the shakeout conveyor. The molds are jacketed and weighted while on the track before pouring and after pouring remain in a cooling area before moving to a mold dumping device for dumping the molds from the pallet carts onto the shakeout conveyor and initiating the return of the carts back to the molding station.

Programmable control means are provided for initiating the sequential dumping of a selected number of pallet carts from a specific pallet line followed subsequently by the dumping of a selected number of pallet carts from a different pallet line. The molds are formed at the molding station and are positioned on the movable pallet carts. The pallet carts move down the track towards the dumping station and are jacketed and weighted ready for pouring. The molds are poured from an overhead ladle and after a cooling period, the jackets and weights are removed and the molds are permitted to cool further while waiting a sequence for controlled dumping onto the common shakeout conveyor.

For a better understanding of the invention, reference should be had to the following detailed description taken in conjunction with the drawings, in which:

FIG. 2 is a side elevational view of one of the automatic mold pallet lines of the system;

FIG. 3 is a side elevational view of the mold dumping station at the discharge end of a mold pallet line;

FIG. 4 is an elevational view similar to FIG. 3 but showing the dumping mechanism in a pallet cart returning position;

FIG. 5 is a front elevational view of a mold pallet cart with several molds thereon, one of which has been jacketed and weighted for pouring;

Figure 1:
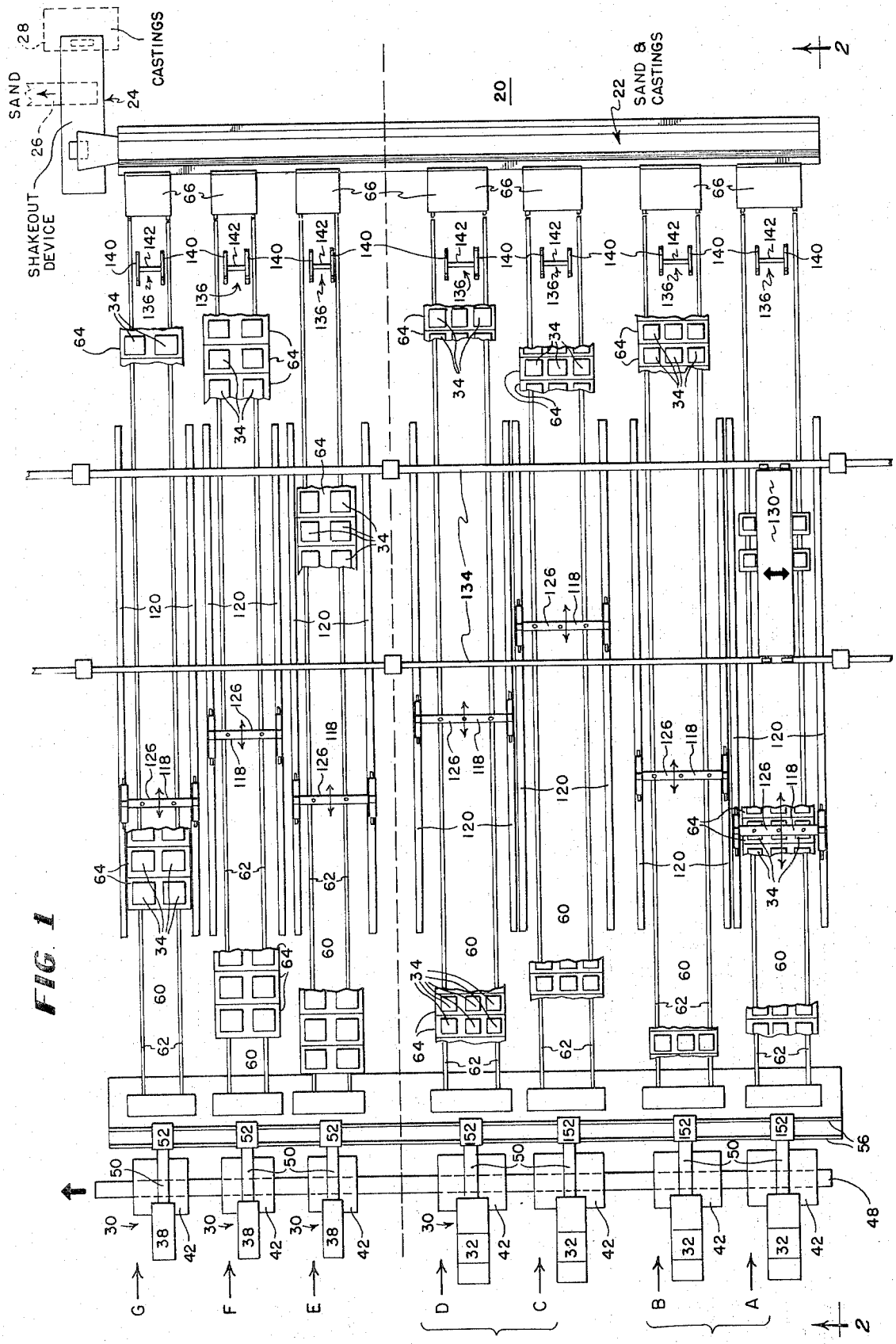
FIG. 1 is a top plan view of an automatic foundry system in accordance with the present invention.

Referring now more particularly to the drawings, therein is illustrated a new and improved automatic foundry system constructed in accordance with the features of the present invention and represented generally by the reference number 20 in FIG. 1. The foundry system includes a plurality of parallel, separate, mold pallet lines A, B, C, D, E, F, G etc. all of which are arranged to feed a common shakeout conveyor 22 for conveying the finished molds and castings to a shakeout device 24 for separating the castings from the molding sand. The sand removed in the shakeout device 24 is usually conveyed back to a sand reclamation system (not shown) by a conveyor 26 and the castings are collected at the discharge end of the shakeout device in a tote box 28. The shakeout conveyor 22 may be of the vibratory type shown in U.S. Pat. No. 3,335,861 wherein vibration forces are utilized to help break up the molding sand away from the castings as the sand and castings move toward the shakeout device 24. This, of course, reduces the work load on the shakeout device which may be of the type manufactured and sold by the General Kinematics Corporation of Barrington, Illinois and as shown generally in U.S. Pat. No. 3,232,431.

Each of the mold pallet lines A, B, C, D, E, F, G, etc. includes a molding station 30 at the left hand end (FIGS. 1 and 2) or end opposite the discharge end adjacent the shakeout conveyor 22. The molding stations 30 may include automatic mold making machines 32 (on lines A, B, C and D) wherein molds 34 are formed and are placed on metal bottom boards 36 in an automatic cycle. The automatic machines 32 may be of the type produced and sold by the Hunter Automated Machinery Corporation of Schaumburg, Illinois and described as Model HMP-20 Automated Matchplate Molding Machine in their bulletin No. 20-101 and for heavier, larger castings, the molding stations 30 (lines E, F & G) may be provided with manual, mold filling devices 38 such as shown in U.S. Pat. Nos. 2,626,053 and 3,253,305.

Each molding station 30 is provided with a sand supply hopper 40 (FIG. 2) and a pit 42 with a floor grate 44 and hopper 46 to receive and collect excess sand. This sand is returned to the main sand supply system (not shown) via a conveyor 48 interconnecting the sand pits. The molds 34 on their bottom boards 36 that are produced at the molding stations 30 are delivered at working level on short conveyors 50 and are picked up by overhead cranes 52, each having a fork-like lifting mechanism 54 (FIG. 2) with a pair of spaced apart horizontal legs adapted to move under the bottom board of a mold for pick-up thereof. The cranes 52 are mounted on suitable support rails 56 for convenient manipulation by the mold machine operator.

In accordance with the invention, each mold pallet line A, B, . . . etc. includes an upper track 60 comprising a pair of spaced apart, parallel rails 52 extending between the molding forming station 30 at the left hand end and the shakeout conveyor 22 at the opposite end. The tracks 60 are adapted to guide and support a string or train of unconnected, free rolling pallet carts 64 moving along the line from the molding station to the shakeout conveyor. Each cart is adapted to hold one or more molds 34 on its bottom board 36 and during the process of cart movement down the line, weight and jacket setting takes place and metal pouring and cooling is accomplished. Eventually the molds progress to a dumping station adjacent the end of the line wherein a dumping machine 66 is utilized to dump the molds 34 and the cooled castings contained therein into the conveyor 22 and substantially return the empty carts 64 with the bottom boards 36 thereon back to the molding station 30.

Return of the empty carts 64 from the dumping devices 66 is accomplished on lower return tracks 70 which underlie the feed tracks 60 as best shown in FIGS. 2, 3 and 4. Each return track includes a pair of parallel rail members 72 for supporting the carts and the rails are curved upward at the right hand end (FIGS. 3 and 4) to receive the empty carts 64 from the dumping device 66. As best shown in profile of FIG. 2 the return track 70 is sloped gently downwardly from the dumping device 66 toward the molding station 30 so that the carts 64 will roll by gravity into a starting position adjacent the molding station ready for the next cycle of molding. The upper tracks 60 of each mold pallet line are substantially level (FIG. 2) from the molding station to a point or area approximately three quarters of the way down the length of the line and from this region the track rails 62 slope downwardly toward the dumping devices 66 so that the carts 64 will roll down into a dumping position at the end of the track under the influence of gravity. As new molds are placed on each cart 64 at the molding station 30 the carts are moved along the upper rails and the string or train of carts on each line side by side constitute a moving pallet floor of the foundry system 20.

As best shown in FIGS. 2–5, the rails 62 are supported on the upstanding flanges of angles 63 and either the flanges or the angles are provided with vertical slots (FIGS. 3 & 4) to permit vertical adjustment of the rails relative to the angle flanges in order to compensate for rail wear. Suitable fasteners such as bolt and nut assemblies 65 extending through said slots are provided for securing the rails to the supporting angle flanges after a selected adjustment is made.

In accordance with the invention the rails 62 and support angles 63 are carried on suitable cross-members 67 which members are supported from a floor 69 or other support structures on vertical posts 71. At the bottom, each post is provided with a base plate 73 and the base plates 73 are supported for vertical adjustment relative to the floor 69 on jack screws 75 having enlarged foot plates 77 at the lower end. Elevation of the dumping devices 66 is also adjustable to match that of the rails and adjustment is accomplished by means of brackets 79 attached to the dumping device bases 80 and jack screws 71 with enlarged foot plates 83 at the lower end. The jack screws 75 for the rails 62 are adjustable to provide the desired angle of slope for the rails so that the loaded carts 64 will roll freely toward the dumping devices 66 which are leveled to match the rails and receive the carts by the jack screws 81. The angle of slope depends on the weight of the loaded carts and can be adjusted when required because of changes in castings or other parameters. Moreover, the point along the pallet lines at which the rails 62 change from a substantially level or horizontal extension to a downward slope toward the dumping devices 66 can be varied to control the number of carts in the bank biased to roll freely toward the dumping position.

The pallet cart dumping devices 66 for dumping the molds 34 from their bottom boards or pallets 36 may be of the type shown and described in U.S. Pat. No. 2,681,738 and each includes a track control fluid cylinder 74 for pivoting a track 76 on which a cart to be dumped is positioned between a receiving position level with a table 78 and a dumping position (FIG. 3) wherein the entry end of the track is pivoted upwardly away from the table 78. As shown in FIGS. 3 and 4 the table is mounted for pivotal movement between a horizontal, receiving and dumping position (FIG. 3) and a downwardly inclined, cart return position (FIG. 4) and for this purpose the dumping machine 66 includes a base frame 80 with an upright structure 82 which carries a horizontal pivotal axle 84 for the table. The track cylinder 74 is pivotally supported from a carriage structure 86 attached to the table and moves with the table. Control of the table relative to the base structure 80 is provided by a table cylinder 88 having one end pivotally connected to the base and the opposite end connected to the table 78 through a linkage 90. A stop structure 92 is provided to support the table 78 in the return position (FIG. 4) with the table track 76 aligned with the return track 70 so that an empty pallet cart 64 will be returned toward the molding station 30.

When the table cylinder 88 is in a retracted condition (FIG. 3) the table structure 78 is substantially level in a receiving and dumping position. After receiving a loaded pallet cart 64 from the upper track 60 which slopes downwardly toward the dumping machine, the track or dumping cylinder 74 is extended to pivotally elevate the track 76 above the table structure 78 so that the molds 34 and castings contained therein slide off into the conveyor 22. The track 76 has an upright stop member 94 along the discharge edge adjacent the conveyor, which stop member is high enough to engage the bottom boards 36 on a pallet cart and prevent the boards from sliding off into the conveyor while permitting the molds 34 to be dumped. After dumping, the cylinder 74 is retracted to return the track 76 into parallel with the table 78 and the table cylinder 88 is then extended to pivot the table and track to the return position (FIG. 4) wherein the empty pallet cart 64 and bottom boards 36 carried thereon roll onto the rails 72 of the lower return track 70 and move toward the molding station 30 to be ready for the next cycle.

As best shown in FIG. 2, the lower return tracks 70 slope downwardly toward the molding stations 30 so that the empty pallet carts 64 are biased toward the left hand end of the rails 72. Each line is provided with a lift or elevator unit 96 for lifting the carts one at a time from the lower track 70 to a starting position on the upper track 60 ready to receive the molds 34 and bottom boards 36. The old bottom boards are removed from the carts at the lift and are returned to the molding station for reuse. When an empty pallet cart 64 is in position at the top of a lift 96 it is loaded with molds from the adjacent molding station by means of the overhead crane 52 and fork-like support 54. The loaded cart is then started down the line toward the dumping device 66 at the end.

Each pallet cart 64 (FIG. 5) includes a rectangular frame 98 having a pair of front and back members 100 and cross members 102 at opposite ends. A plurality of intermediate cross members 104 are provided at spaced intervals to extend between the front and back members 100 to provide a support structure or base for the bottom boards 36 and molds 34 loaded thereon as shown in FIG. 5. Each cart includes two pairs of flanged wheels 106 for rolling engagement with the track rails 62 and 72 and each pair of wheels is carried on axles 108 which are mounted to extend between the flanges of inverted channels 110 connected at opposite ends to the front and back frame members 100. As shown in FIG. 5, the front and back frame members are formed with spaced apart notches 100a along the upper edge and the notches are dimensioned and spaced to accommodate the horizontal legs of the lift member 54 used for loading the molds onto the carts from the molding machine conveyors 50.

As the carts 64 loaded with molds 34 move down the pallet lines AB . . . etc., jackets 112 are set in place over the molds prior to pouring. Additional weights 114 may be added to the jackets and a funnel 116 may be provided for pouring. The weight and jacket setting may be accomplished by means of a traveling overhead lift crane 118 mounted to straddle the line and move up and down on a pair of rails 120 on opposite sides of the line. The cranes 118 include upright legs 122 mounted on a roller base structure 124 (FIG. 2) and a cross member 126 between the legs for supporting chains or cables of suitable hoists (not shown). The hoist cables or chains are provided with hooks 128 at the lower ends for engaging the jackets 112 to lift and manipulate the jackets onto and off of the molds 34. A suitable weight setting device like that shown in U.S. Pat. No. 2,842,819 may be used with a horizontal structural member mounted on a traveling crane structure to move up and down the line between jacket setting and jacket removing positions. After pouring has been accomplished and a suitable cooling period has transpired the weights and jackets are removed from the molds at the far end of the rails 120 and the traveling crane 118 is moved to the opposite end of the rail to set the weights and jackets on the new carts coming down the line prior to pouring.

Pouring of the molds is accomplished with an overhead crane 130 and pouring ladel 132 traveling along a pair of overhead rails 134 extending transversely of the mold pallet lines A, B, C, D . . . etc. The ladel is filled with hot metal and the crane is positioned over the desired mold pallet line to pour the weighted and jacketed molds in the pouring area between the overhead rails.

After pouring of the molds has been accomplished and sufficient cooling time has elapsed the weight and jackets are removed and the pallet carts with castings cooling in the molds move toward the mold dumping machines 66 at the end of the line.

In accordance with the invention, each mold pallet line A, B, C . . . etc. is provided with a control gate 136 adjacent the mold dumping machine 66 at the discharge end for feeding the mold pallet carts 64 one at a time into the machine for dumping. As best shown in FIGS. 3 and 4 each gate 136 includes a pair of upright forward stops 138 at the forward end of a pair of elongated members 140 inside the rails 72 and mounted for pivotal movement on a transverse axle 142 (FIGS. 1 and 3). At the opposite end, each member 140 is provided with an upright rear stop member 144 for engaging the second pallet cart 64 in the line awaiting dumping action. As best shown in FIG. 3, the gate 136 is pivotal between a closed position wherein the forward stops 138 engage the front frame member 100 of the leading pallet cart 64 in the line. Because the rails 72 of the upper tracks 70 slope downwardly toward the dumping machines 66, the carts are biased toward the machines by gravity and would normally roll onto the dumping machines unless engaged and stopped by the closed gates 136. The gate is maintained in the closed position while a pallet cart 64 is being dumped and returned and after return of the cart is effected, the gate is then opened by pivoting movement of the members 140 about the axle 142 until the forward stops 138 move downwardly out of engagement with the front member 100 of the next leading pallet cart 64 in the string waiting to be dumped. When the gate is in the open position (dotted lines FIG. 3), the leading pallet cart is free to roll down the sloped rails 72 onto the track 76 of the dumping machine 66 against the stop 94.

The feeding of two carts onto the track of the dumping machine at one time is prevented by the rear stop 144 of the gate, which stops project upwardly above the rails (FIG. 3 dotted lines) to engage the rear frame member 100 of the second pallet cart in the line. When the gate is then returned to the closed position, the rear stops 144 are retracted downwardly allowing the pallet cart at the head of the line to move into the number one position against the forward stops 138 ready for dumping.

The gates 136 are activated between open and closed positions in synchronism with the operation of the associated dumping machines and for this purpose gate cylinders 146 are provided to pivot the members 140 about the axles 142.

In accordance with the invention, the automatic foundry system 20 includes a control system (FIGS. 6 and 7) for operating the mold pallet lines A, B, C, D . . . etc. in a selected sequence so that a selected number of pallet carts 64 from one particular line may be dumped into the shapeout system followed by a selected number of carts from another chosen pallet line. This greatly reduces the sorting of castings that are required after the castings have been separated from the molding sand in the shakeout mechanism 24. The control system can be programmed so that a large run of identical castings can be dumped before castings of a different type are processed. Moreover, the orderly and automatic control of the number of carts from one line that are dumped and the line sequence of dumping eliminates the need for individual dumping machine operators on the foundry floor, a place which is not pleasant to work at because of the heat and smoke during casting operations. Moreover, the automatic control of the dumping process prevents intermixing of castings from different lines if desired and prevents overloading of the shakeout system caused by too many dumping machines 66 being operated at one time. This latter condition sometimes results in the shutdown of the entire foundry operation while the shakeout system is cleared and unclogged of castings and sand. Needless to say, a shutdown of this nature is costly in terms if idle labor and machinery and has been a problem until the present invention.

The automatic foundry system 20 includes a control system 200 (FIGS. 6A and 6B) for automatically controlling the operation of the system 20. A suitable source of electrical power is connected to a plurality of main input leads 202 to provide power to operate the various control elements of the circuit 200. A jumper cable 203 is connected in place to connect the power to the control elements of the circuit 200. The electrical power is provided to the circuit 200 through a manual main power disconnect switch 204 and one or more suitable fuse elements 205.

In order to initiate operation of the control system 200, a master start switch 206 is depressed to energize a master control relay 208 and to thereby close a plurality of normally open relay contacts 208A, 208B and 208C. The closure of the contacts 208A and 208C enables electrical power to be provided to the remaining control elements of the circuit 200 and provides a visual indication of the operating condition of the circuit 200 by energizing a lamp 209. The closure of the contacts 208B holds the relay 208 energized notwithstanding the position of the switch 206. At any time during the operation of the system 20, the operation may be interrupted by depressing either a master stop switch 210 or one of a plurality of suitably positioned remote stop switches 212.

As indicated above, in a preferred embodiment, the mold pallet lines A and B operate simultaneously to discharge the molds 34 from the pallet carts 64 to the shakeout conveyor 22 under the control of the circuit 200. The pallet lines A through G are, in a preferred embodiment, designed to operate sequentially. That is, after the lines A and B have simultaneously dumped their preselected number of carts 64, the operation of the lines A and B is terminated and the operation of the lines C and D is initiated by the control circuit 200. In a preferred embodiment, the lines C and D also operate simultaneously to dump the molds 34 from a preselected number of pallet carts 64 onto the shakeout conveyor 22. After the lines C and D have dumped their preselected number of carts 64, the operation of the lines C and D is interrupted and the operation of line E is initiated by the circuit 200. After the line E has performed its preselected number of dumping operations, the operation of the line E is interrupted and the operation of the line F is initiated by the control circuit 200. Similarly, after the line F has performed its preselected number of dumping operations, the operation of the line F is interrupted and the operation of line G is initiated by the control 200. Any one or more of the lines A through G may be switched "off" to cause the circuit 200 to by-pass that line.

Figure 6A:
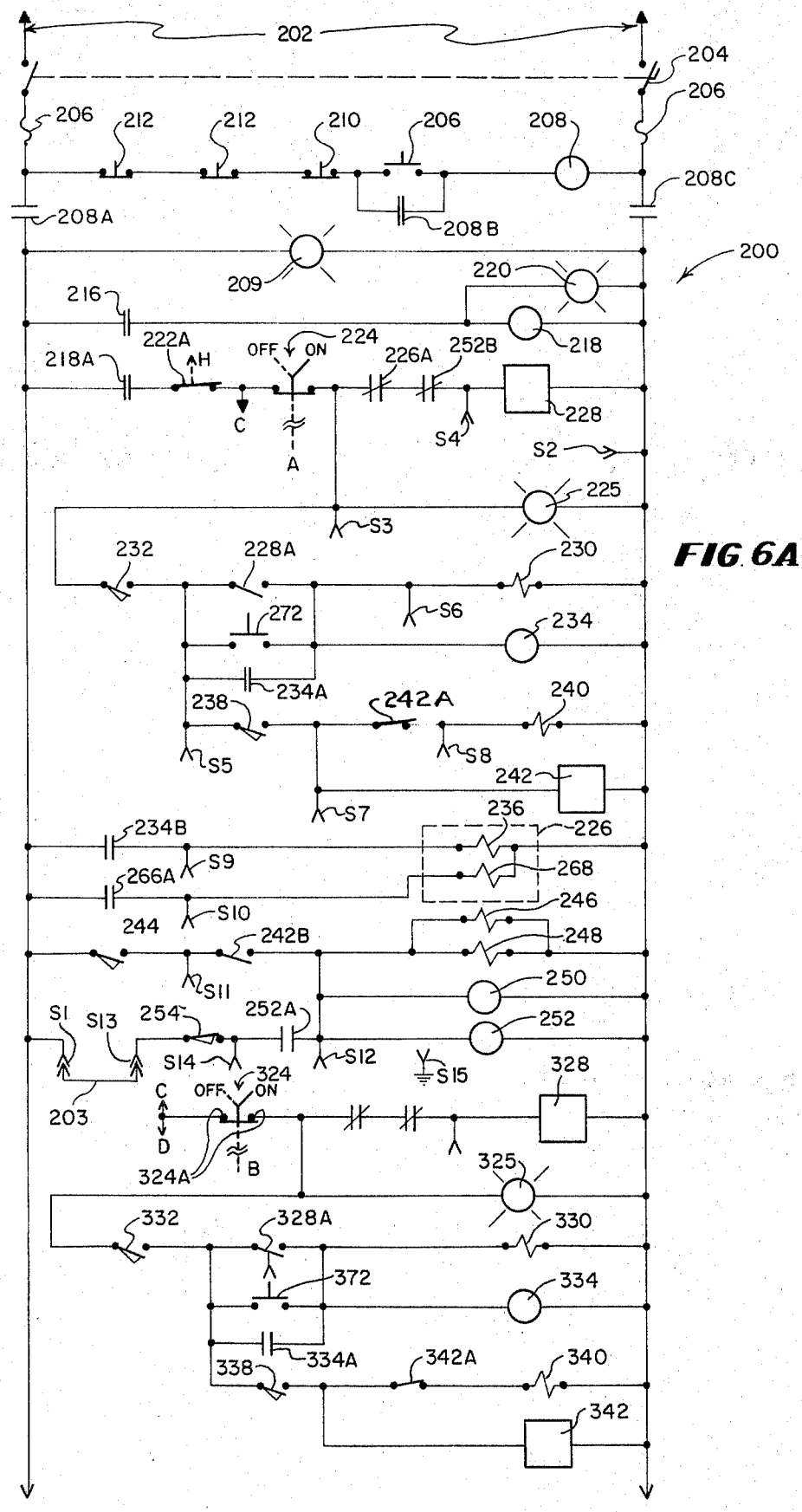
FIGS. 6a and 6b is a schematic diagram of an electrical control system of the automatic foundry system in accordance with the present invention.
Figure 6B:
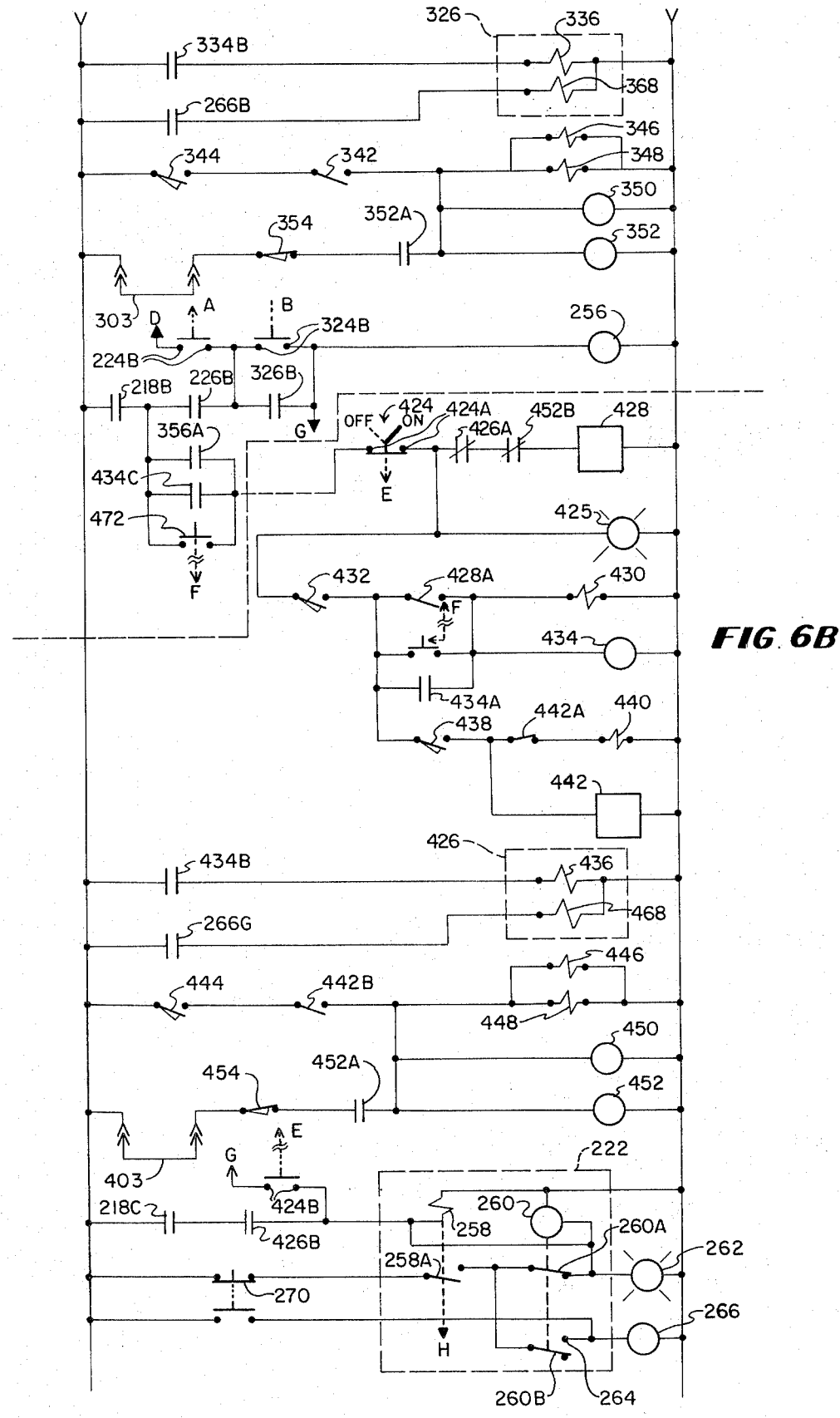

Obviously, suitable controls could be easily incorporated into the circuit 200 to permit the lines A through G to dump in any desired sequence. Since the controls for the operation of the pallet lines C and D are essentially identical to the controls for operating the pallet lines A and B and since the controls for operating pallet lines E and F are essentially identical to the controls for operating pallet line G, FIGS. 6A and 6B depict only the controls for operating pallet lines A, B and G.

Before the operation of the pallet lines A through G may be initiated, the shakeout conveyor 22 and the shakeout device 24 must be operating. Thus, a pair of normally open relay contacts 216 controlled by a shakeout interlock relay (not shown) are provided to prevent the operation of any of the lines A through G unless the conveyor 22 and the device 24 are operating.

Initiating the operation of the conveyor 22 and the device 24 energizes the shakeout interlock relay and thereby closes the contacts 216 to energize an interlock relay 218. Upon the energization of the relay 218, a lamp 220 is energized to indicate that the conveyor 22 and the device 24 are operating. This relay 218 controls a plurality of sets of normally open relays contacts 218A, 218B, 218C and others not shown that, when closed by the energization of the relay 218, permit the subsequent operation of each of the pallet lines A through G.

In order to initiate operation of the pallet lines A and B, a presettable repeat delay timer 22 for the system 20 must have completed its time out period and thereby returned the normally closed switch contact 222A to its closed position. Ideally, the timer 222 should be variably presettable between zero and ten minutes to provide a preselectable delay between system dumping operations. If the timer 222 has not completed its preset time out period when the switch 206 is depressed, the switch contact 222A is held open until the completion of the time out period.

In order to initiate the automatic operation of the pallet line A, a two-position selector switch 224 controlling two pairs of switch contacts 224A and 224B must be placed in its "on" position in which the contacts 224A are closed and the contacts 224B are opened to energize a lamp 225. The lamp 225, when energized, indicates that the pallet line A is in condition for manual or automatic dumping operations. When the switch 224 is placed in its "off" position the switch contacts 224A are opened and the contacts 224B are closed to thereby prevent or by-pass the operation of the pallet line A.

If a counter 226 for programming the number of pallet carts 64 to be dumped by the pallet line A is preset to a number greater than zero, a pair of normally closed relay contacts 226 remain in their normally closed condition to energize a variable time delay period of a timer 228. The timer 228 interposes a presettable time delay preferably of from 0 to 60 seconds, between successive dumpings of the pallet carts 64 by the pallet line A.

When the preset time delay of the timer 228 is completed, a normally open switch contact 228A is closed to thereby energize a solenoid 230 for controlling a pneumatic valve for the gate cylinder 146 to cause the gate cylinder 146 to lower the forward stops 138 and thereby permit the forwardmost pallet cart 64 to roll onto the tracks 76 of the dumping machine 66 in preparation for a dumping operation. The solenoid 230 will only be energized if the table 78 is in its "up" position (FIG. 3) as sensed by the closure of a normally open limit switch 232. Thus, the forwardmost cart 64 is prevented from advancing onto the dumping machine 66 until the table 78 is in its "up" position.

Simultaneously with the energization of the solenoid 230, a relay 234 is energized to close two pairs of normally open relay contacts 234A and 234B. The solenoid 230 and the relay 234 are held energized by the closure of the contacts 234A. The counter 226 is stepped by the energization of a solenoid 236 in response to the closure of the contacts 234B to record one dumping operation by the pallet line A.

When the forwardmost pallet cart 64 rolls into position for dumping against the stop 94, a normally open limit switch 238 is closed to thereby energize a solenoid 240 which, when energized, causes the track cylinder 74 to raise the track 76 and thereby dump one or more molds 34 from the pallet cart 64 into the shakeout conveyor 22 (FIG. 3). Simultaneously a timer 242, preferably variably presettable between 0 and 10 seconds, is energized to begin its time out period. When the timer 242 completes its preset time out period, a normally closed switch contact 242 is opened to de-energize the solenoid 240 and to thereby cause the tracks 76 to return to their normal horizontal position parallel to the table 78 (FIG. 3).

Simultaneously, a normally open switch contact 242B is closed when the timer 242 completes its preset time out period with no immediate effect. When the tracks 76 return to their horizontal position parallel to the table 78, a normally open limit switch 244 is closed to thereby energize a pair of solenoid controls 246 and 248. The solenoid control 246 causes the gate cylinders 146 to lower the rear stops 144 and simultaneously raise the forward stops 138 to thereby advance the next pallet cart 64 into position against the forward stops 138. The solenoid control 248, when energized, causes the table cylinder 88 to lower the table 78 (FIG. 4) to thereby permit the empty pallet cart 64 to return along the return tracks 70 for subsequent use by the system 20.

Simultaneously with the energization of the solenoids 246 and 248, two relays 250 and 252 are energized. The energization of the relay 250 returns the relay contacts 234A and 234B to their normally opened condition to thereby de-energize the relay 234. The use of the two relays 234 and 250 to control the condition of the contacts 234A and 234B enables the operation of the pallet line A to be interrupted after the energization of the relay 234 and before the energization of the relay 250 and to be subsequently resumed at the same point in the dumping sequence of the pallet line A.

The relay 252, when energized, closes a pair of normally open relay contacts 252A and opens a pair of normally closed contacts 252B. The relay 252 is held on through the closed contacts 252A and a normally closed limit switch 254. The opened contacts 252B reset the timer 228 for a new dumping cycle. The timer 242 is reset by the opening of the limit switch 232 in response to the movement of the table 78 from its up or horizontal position (FIG. 3) to its lowered position (FIG. 4) and by the opening of the limit switch 238 in response to the departure of an empty cart 64 from its dump position in engagement with the stop 94.

The normally-closed limit switch 254 is momentarily opened in response to the passage thereby of an empty pallet cart 64 in transit from the tracks 76 to the tracks 70. The momentary opening of the limit switch 254 de-energizes the relay 252 to open the contacts 252A and to thereby de-energize the solenoid control 248 which in turn causes the table cylinder 88 to return the table 78 to its up or horizontal position. De-energizing the relay 252 simultaneously closes the contacts 252B to start the running of the present time delay of the timer 228.

As soon as the table 78 returns to its up or horizontal position (FIG. 3), the limit switch 232 is closed to energize the solenoid 230 after the expiration of the time delay of the timer 228 to initiate another pallet cart dumping cycle on the pallet line A provided the counter 226 has not reached coincidence.

Coincidence for the counter 226 occurs when the pallet line A has performed its preset number of pallet cart dumping operations. When the counter 226 reaches coincidence, the normally closed relay contacts 226A open to prevent the timer 228 from initiating its time delay period. Further, when the counter 226 reaches coincidence, a pair of normally open contacts 226B close to initiate the dumping operations of pallet lines C and D upon the termination of the dumping operation of pallet line B.

As previously indicated, in a preferred embodiment, the pallet line B performs its dumping operation simultaneously with the dumping operation of the pallet line A. The controls governing the operation of the pallet line B are essentially identical with the controls for pallet line A as set forth in FIGS. 6A and 6B. The controls governing the operation of pallet line A all include at least three numerical digits with the hundreds digit being a 2. The controls governing the operation of pallet line B also include at least three numerical digits with the hundreds digit being a 3. The controls for pallet line B which operate essentially the same as the corresponding controls for pallet line A have the same tens and units digits as the corresponding controls for pallet line A. Thus, the operation of the controls for pallet line B may be clearly understood by referring to the description above concerning the operation of pallet line A and by mentally substituting the "three hundred" series designations set forth in FIGS. 6A and 6B to designate the controls for pallet line B for the "two hundred" series designations set forth above in describing the operation of the controls for pallet line A. For example, the operation of a timer 328 for pallet line B may be clearly understood by reference to the description above concerning the timer 228 for pallet line A.

Although in an operating embodiment the operation of pallet lines C and D would follow sequentially from the operation of pallet lines A and B, since the controls for pallet lines C and D are essentially identical to those for A and B set forth herein, the controls for pallet lines C and D are not illustrated in FIGS. 6A and 6B and are not further described herein. Further, since the controls for operating pallet lines E and F are essentially identical to the controls for operating pallet line G, only the controls for operating pallet line G are illustrated in FIGS. 6A and 6B and are referred to hereinafter. Further, since the controls for operating pallet line G are essentially identical to the controls for operating pallet line A, a detailed description concerning the operation of the controls for pallet line G is not set forth hereinafter. The controls for pallet line G all include at least a three digit numerical designation with the hundredths digit being a 4. The controls for pallet line G that are essentially identical to the controls for pallet line A utilize as a numerical designation the same tens and units digits as the corresponding controls for pallet line A. Thus, a complete understanding of the operation of the controls for pallet line G may be obtained by referring to the above description concerning the controls for pallet line A and by mentally substituting the "four hundred" series designations set forth in FIGS. 6A and 6B to designate the controls for pallet line G for the "two hundred" series designations set forth above in describing the operation of the controls the pallet line A. For example, a complete understanding of the operation of a timer 428 for the pallet line G may be obtained by referring to the above description concerning the operation of the timer 228 for the pallet line A.

If the selector switches 224 and 324 are placed in their "on" position, the operation of pallet lines C and D is initiated after the pallet lines A and B have performed their preset number of dumping operations as indicated by the counters 226 and 326 reaching coincidence. Upon reaching coincidence, the contacts 226B and 326B are closed to energize a relay 256 for closing a set of normally open relay contacts 256A. Closure of the contacts 256A will initiate operation of pellet lines C and D if the selector switches for those pallet lines corresponding to the selector switch 224 for pallet line A are placed in their "on" position.

In order to simplify the description of the control circuit 200 for the foundry system 20, FIGS. 6A and 6B depict the contacts 256A as eventually initiating the operation of pallet line G if the selector switch 424 is in its "on" position. The coincidence condition of the counters 226 and 326 may be simulated by placing either one or both of the selector switches 224 and 324 in their "off" position. For example, if the selector switch 224 is placed in its "off" position, the relay 256 is energized when the counter 326 reaches coincidence.

FIG. 6B depicts an additional set of normally open relay contacts 434C controlled by the relay 434 and 450 for maintaining power to the controls for pallet line G after the energization of the relay 434. Upon the energization of the relay 434, the relay contacts 434A, 434B, and 434C are closed and remain closed until opened by the energization of the relay 450. Thus, the operation of the pallet line G may be interrupted after energization of the relay 434 and before energization of the relay 450 and resumed thereafter at the same point in the dumping sequence of the pallet line G. The controls for the pallet lines C, D, E and F include an extra set of normally open relay contacts corresponding to the contacts 434C.

After the pallet line G has performed its preset number of dumping operations as indicated by the counter 426 reaching coincidence, a pair of normally open relay contacts 426B are closed to energize the repeat delay timer 222 to interpose a variable, presettable delay between system dumping operations. Preferably, the delay of the timer 222 is variably presettable between 0 and 10 minutes and optimumly includes a minimum delay of 20 seconds in order to provide sufficient time for all of the counters of the control circuit 200 to reset.

Closure of the contacts 426B energizes a solenoid 258 and initiates the running of a timer mechanism 260. In addition, a lamp 262 is energized to indicate that the timer 222 is in its preset time delay. The solenoid 258 controls a normally open contact 258A and the normally closed contacts 222A. When the solenoid 258 is energized, the contact 258A is closed to maintain power to the timer 222 and the contact 222A opens to prevent the initiation of the dumping operation of the pallet line A before the completion of the preset time delay period of the timer 222.

After the timing mechanism completes its preset time delay period, a normally closed contact 260A is opened and a contact 260B is moved from its position illustrated in FIG. 6B into contact with the contact 264 to thereby energize a relay 266. The energization of the relay 266 closes a plurality of pairs of normally open relay contacts 266A, through 266G to energize a plurality of counter reset solenoids 268, 368 and 468 to thereby reset the counters 226, 326 and 426, respectively, to their preset count. Resetting the counters 226, 326 and 426 returns the contacts 226A, 326A and 426A to their normally closed condition and returns the contacts 226B, 326B and 426B to their normally opened condition. The opening of the contacts 426B de-energizes the solenoid 258 and resets the timing mechanism 260. De-energizing the solenoid 258 returns the contact 222A to its normally closed condition to reinitiate the dumping operation of the system 20 on pallet lines A and B.

In the event of a temporary interruption of the operation of the system 20 by a power failure or by the depression of one or more of the switches 210 or 212, the operation of the system 20 will resume at its point of interruption after resumption of the power to the control circuit 200. At any time during the operation of the system 20, a manual reset switch 270 may be depressed to energize the relay 266 to thereby reset the timer 222 and the counters 226, 326 and 426 to initiate a restart of the system 20 on pallet lines A and B. A plurality of manual start buttons 272, 372 and 472 are provided for each of the pallet lines A through G to provide a manual override on the automatic dumping operation of each of the pallet lines. For example, if the selector switch 224 is positioned in its "on" position, if the conveyor 22 and device 24 are operating and if the table 78 is in its up or horizontal position as detected by the closure of the normally open limit switch 232, the switch 272 may be depressed to initiate a dumping operation on the pallet line A. Since the contact 222A is open during the time delay period of the repeat delay timer 222, the manual start switches 272 and 372 are prevented from initiating the dumping operations of pallet lines A and B until the timer 222 has completed its preset time delay period.

Figure 7:
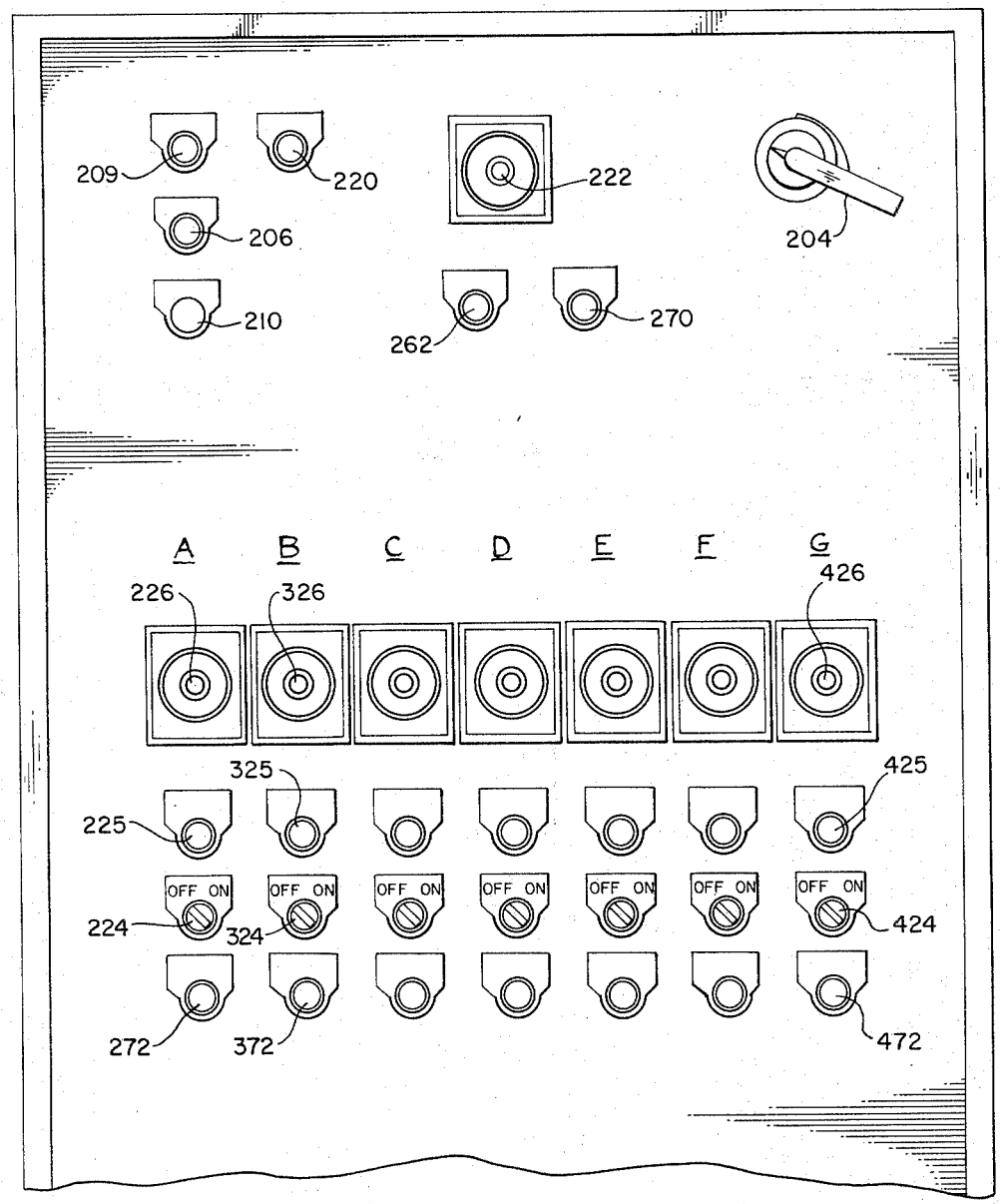
FIG. 7 is a front elevational view of an operator control panel of the automatic foundry system.

FIG. 7 depicts an illustrative embodiment of a suitable control panel 201 for controlling the operation of the automatic foundry system 20. The functions of the various control elements of the panel 201 are described above. The control elements of the panel 201 for pallet lines A, B and G are suitably numerically designated. The corresponding control elements for pallet lines C, D, E and F are not numerically designated but function identically to the corresponding control elements for pallet lines A, B and G.

Figure 8:
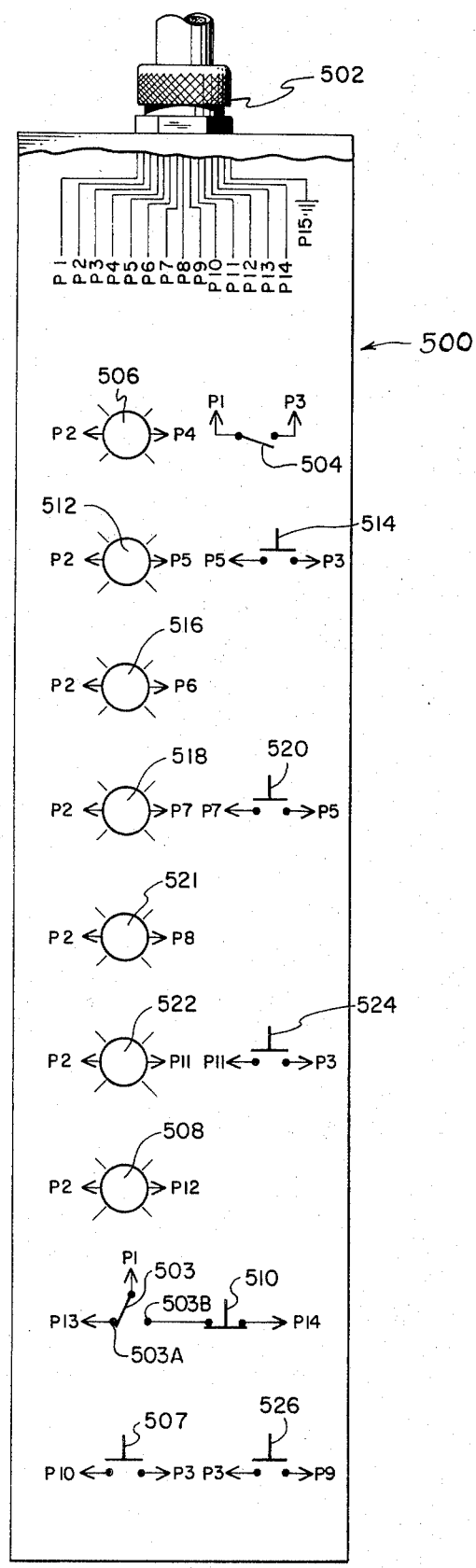
FIG. 8 is a schematic diagram of a testing device for testing the control system of the automatic foundry system of the present invention.

In accordance with an important feature of the present invention, a testing mechanism 500 (FIG. 8) is provided for automatically testing the various functions controlling each of the pallet lines A through G independently of the operation of the other pallet lines. The testing mechanism 500 is designed to be used to test the operating functions of any one of the pallet lines A through G. In order to enable a complete appreciation of the operation of the mechanism 500, the operation of the mechanism 500 is set forth below with reference to pallet line A. To initiate operation of the testing mechanism 500, a standard multi-pin cable connector 502 is used to connect each of the plugs P-1 through P-15 to the corresponding sockets S-1 through S-15, respectively (FIG. 6A). Before the connector 502 is connected to the sockets S-1 through S-15, the jumper cable 203 is removed.

To initiate a testing operation, the switch 224 is placed in its "off" position. A test of the pallet line A may be conducted with or without a pallet cart 64. The delay timer 222 and the interlocking relay contacts 216 have no effect on the testing operation of the pallet line A.

A switch 503 is initially set to contact a switch contact 503A and a switch 504 is moved from an open condition to a closed condition to apply power to the input of the timer 228. If the counter 226 has not reached a coincidence condition, the timer 228 will begin its time delay period. The initiation of the time delay period of the timer 228 is indicated by a lamp 506. If the counter 226 has reached a coincidence condition, a reset switch 507 may be depressed to reset the counter 226 to its previously preset number of dumping operations.

If the relay 552 remains energized due to the failure or malfunction of the limit switch 254, as indicated by the illumination of a lamp 508, the switch 503 should be switched into contact with a switch contact 503B and a switch 510 should be momentarily depressed to an open condition to de-energize the relay 552. After the de-energization of the relay 552, the switch 503 may be placed in its initial condition in contact with the switch contact 503A and the testing operation may be continued. After the timer 228 completes its time delay period and if the table 78 is in its up or horizontal position, the solenoid 230 is energized as indicated by the illumination of a lamp 512. If at this point, the table 78 is in its up or horizontal position and the lamp 512 is not illuminated, a switch 514 may be depressed to energize the solenoid 530 and to illuminate the lamp 512. If the lamp 512 is illuminated and the solenoid 230 is energized in response to the depression of the switch 514, a malfunction in the operation of the limit switch 532 is indicated and the switch 532 should be replaced.

The energization of the solenoid 230 causes a lamp 516 to be illuminated to indicate that the solenoid 230 is operating properly. Energizing the solenoid 230 further causes a cart 64 to be released onto the tracks 76 and to close a limit switch 238 when the cart 64 engages the stop 94 on the dumping machine 66. Closure of the limit switch 238 energizes an indicating lamp 518. If the lamp 518 fails to light, a malfunction in the operation of the limit switch 238 is indicated and the switch 238 should be replaced. If a cart 64 is not used in a testing operation, a switch 520 should be held in its closed condition until the tracks 76 have been raised and thereafter returned to their horizontal position on top of the table 78 as indicated by the illumination of the lamp 508. Further, a lamp 521 is illuminated during the energization of the solenoid 240 to indicate that the dumping portion of the operating cycle of the pallet line being tested is taking place.

Upon the closure of the limit switch 238 or the switch 520, the relay 240 is energized to raise the tracks 76 to their dump position (FIG. 3). When the timer 242 times out, the solenoid 240 is de-energized to return the tracks 66 to their normal position parallel to and atop the table 78. When the tracks 76 return to their normal position parallel to and atop the table 78, a lamp 522 is energized if the limit switch 244 is functioning properly and closes. If the limit switch 244 is malfunctioning and the lamp 522 fails to become energized at this point, a switch 524 should be depressed to simulate the operation of the limit switch 544. If the lamp 522 is illuminated by the depression of the switch 524, the limit switch 244 should be replaced.

Upon the closure of the limit switch 244 or upon the depression of the switch 524, the solenoid controls 246 and 248 and the relays 250 and 252 are energized to lower the table 78 to its return position (FIG. 4) to enable a cart 64, if used during the testing operation, to return to the beginning of the pallet line A along the return tracks 70. When the pallet cart 64 passes the limit switch 254, the solenoid controls 246 and 248 and the relays 250 and 252 are de-energized to cause the table 78 to return to its normal horizontal position (FIG. 3).

If the limit switch 254 is malfunctioning or if the pallet cart 64 if not used during a testing operation, the switch 503 should be placed into contact with the switch contact 503B prior to the timing out of the timer 242 and the switch 510 should be depressed to return the table 78 to its normal horizontal position. If the pallet cart 64 is used for the testing operation and if the table 78 fails to return to its normal horizontal position until the switch 510 is depressed, the limit switch 254 should be replaced.

In addition to the provision of the switch 507 for resetting the counter 226, a switch 526 is provided for stepping the counter 226 one count for each depression of the switch 526. The depression of the switch 526 is effective to advance the counter 226 only while the relay 234 is de-energized. Before the pallet line A is returned to its automatic operation under the control of the circuit 200, the counter 226 should be properly set. That is, the switch 526 should be depressed the required number of times in order to place the counter 226 in a coincidence condition when automatic operation is occurring on a pallet line that normally operates or functions later in the automatic operation of the system 20 than the pallet line being tested. If automatic operation is, at that moment, occurring on a pallet line that normally operates or functions earlier in the automatic operation of the system 20 than the pallet line being tested, the switch 507 should be depressed to reset the counter for that pallet line.

After the counter for the pallet line A is placed in its proper condition, the switch 504 should be turned to its opened condition and the connector 502 disengaged from the control circuit for pallet line A. After replacing the jumper cable 203 and placing the switch 224 in its "on" position, the pallet line A may again function automatically under control of the circuit 200.

Obviously, many modifications and variations of the present invention are possible in light of the above disclosure. Thus, it is to be understood that, within the scope of the appended claims, the invention may be practiced otherwise and as specifically described.

I claim:

1. A device for transferring a plurality of molds from at least one mold-forming station to at least one receiving station comprising
at least one transfer path having a first end associated with said mold-forming station and a second end associated with said receiving station,
means for transporting a first mold from said first end to said second end, said transporting means comprising a first means for physically supporting said first mold,
means positioned at said second end for receiving said supporting means and for automatically transferring said first mold from said path to said receiving station and
means positioned at said second end for automatically reciprocating between a stop condition in which said first supporting means is prevented from being received by said receiving and transferring means and a pass condition in which said first supporting means is enabled to be received by said receiving and transferring means, said transporting means including a second means for physically supporting a second mold, said second supporting means positioned closer to said first end than said first supporting means and prevented from further advancement along said path by said reciprocating means being in said pass condition with respect to said first supporting means.

2. A device as defined in claim 1 further comprising means for placing said reciprocating means in said stop condition with respect to said second supporting means subsequent to the transfer of said first mold by said receiving and transferring means from said path to said receiving station.

3. A device as defined in claim 1 further comprising means for automatically controlling the placement of said reciprocating means in said stop condition or in said pass condition and for automatically controlling the operation of said transporting means, said receiving and transferring means and said reciprocating means to transfer a variably preselectable number of said molds from said first end to said receiving station.

4. A device as defined in claim 3 wherein said controlling means includes a plurality of means for sensing the position of said first supporting means and the position of said receiving and transferring means during the transfer of said variably preselectable number of said molds from said first end to said receiving station.

5. A device as defined in claim 4 further comprising means for testing the operation of said automatic controlling means and for simulating the operation of at least one of said plurality of sensing means.

6. A device for transferring a plurality of molds from a plurality of mold-forming stations to at least one receiving station comprising
a plurality of transfer paths numerically corresponding to said plurality of mold-forming stations, each of said transfer paths having
a first end associated with one of said mold-forming stations,
a second end associated with said receiving station, means for transporting at least one of said molds from said first end to said second end, said transporting means comprising a first means for physically supporting said one of said molds, and
means positioned at said second end for receiving said first supporting means and for automatically transporting said one of said molds from said path to said receiving station, means for sensing the position of said first supporting means and the position of said receiving and transferring means during the transfer of said one of said molds from said first end to said receiving station, and means
for automatically controlling a first transporting means and a first receiving and transferring means of a first path and a second transporting means and a second receiving and transferring means of a second path to cause a first variably preselectable number of said molds to be transferred from a first mold-forming station to said receiving station and thereinafter to cause a second variable preselectable number of said molds to be transferred from a second mold-forming station to said receiving station.

7. A device as defined in claim 6 wherein said controlling means further automatically controls a third transporting means and a third receiving and transferring means of a third path to cause a third variably preselectable number of said molds to be transferred from a third mold-forming station to said receiving station concurrently with the transfer of said first number of said molds from said first mold-forming station to said receiving station.

8. A device as defined in claim 7 wherein said controlling means includes means for inhibiting the initiation of the transferring of said second variably preselectable number of said molds from said second mold-forming station to said receiving station until the transferring of both of said first variably preselectable number of said molds and said third variably preselectable number of said molds from said first mold-forming station and said third mold-forming station, respectively, to said receiving station is completed.

9. A device as defined in claim 6 wherein each of said transfer paths further includes means positioned at said second end for automatically reciprocating between a stop condition in which said first supporting means is prevented from being received by said receiving and transferring means and a pass condition in which said first supporting means is enabled to be received by said receiving and transferring means.

10. A device as defined in claim 9 wherein said transporting means includes a second means for physically supporting a second mold, said second supporting means positioned closer to said first end than said first supporting means and prevented from further advancement along said path by said reciprocating means being in said pass condition with respect to said first supporting means.

11. A device as defined in claim 10 wherein each of said transfer paths further includes means for placing said reciprocating means in said stop condition with respect to said second supporting means subsequent to the transfer of said first mold by said receiving and transferring means from said transfer path to said receiving station.

12. A device as defined in claim 6 further comprising means for testing the operation of said controlling means and for simulating the operation of at least one of said plurality of sensing means.

13. An automatic foundry system comprising a plurality of mold pallet lines arranged to discharge onto a common shakeout conveyor for carrying molds and castings to a shakeout device; each of said pallet lines comprising a track, a plurality of mold pallet carts movable between a molding station at one end of the track and a dumping station at the other end adjacent said shakeout conveyor and a mold dumping device for dumping molds from said carts onto said shakeout conveyor and initiating the return of said carts to said molding station; and control means for initiating the sequential dumping of a selected number of carts from a selected one of said pallet lines followed by a selected number from a different pallet line.

14. The foundry system of claim 13 wherein said control means includes a gate on each pallet line movable between a stop position and a release position for releasing carts to said dumping station, and adjustable counters for each line for controlling the operation of said gates in sequence with said dumping device to release a selected counted number of carts for dumping from one pallet line followed by a selected counted number of carts for dumping from another pallet line.

15. The foundry system of claim 13 wherein said control means for cycling said gates between said stop and release position in sequence with the operation of said dumping devices, said pallet lines including discharge end portions sloping downwardly toward said gates whereby said carts roll freely onto said dumping devices when said gates are in the release position.

16. The foundry system of claim 13 wherein each gate includes a forward stop for stopping engagement with a first cart on the pallet line ready for dumping when the gate is in a stop position and a rear stop movable into stopping engagement with the second cart on the line ready for dumping when said first cart is released on movement of said gate to said release position.

17. In a foundry system, a pallet line including a track and a plurality of pallet carts movable on said track, a dumping station at one end of said track including means for receiving pallet carts from said track for dumping molds and castings therefrom and gate means movable between stop and release positions for withhold and permitting carts on said track from passing into said dumping station and support means for supporting said track to slope downwardly toward said dumping station for biasing said carts on said track to roll toward said gate for release to said dumping station, said support means including adjustment means for adjusting the angle of slope of said track toward said dumping station, said track includes a substantially level section and a sloping section, said adjustment means being adjustable to change the point along said track whereat said sloping section and said level section intersect to thereby control the number of carts on said track biased toward said gate.

18. The foundry system of claim 17 wherein said support means includes a support structure and means adjustably supporting said rails on said structure.

* * * * *